Aug. 17, 1965    G. K. HOUPT    3,201,616
TIMING AND CONTROL CIRCUIT FOR WELDING APPARATUS
Filed June 26, 1961
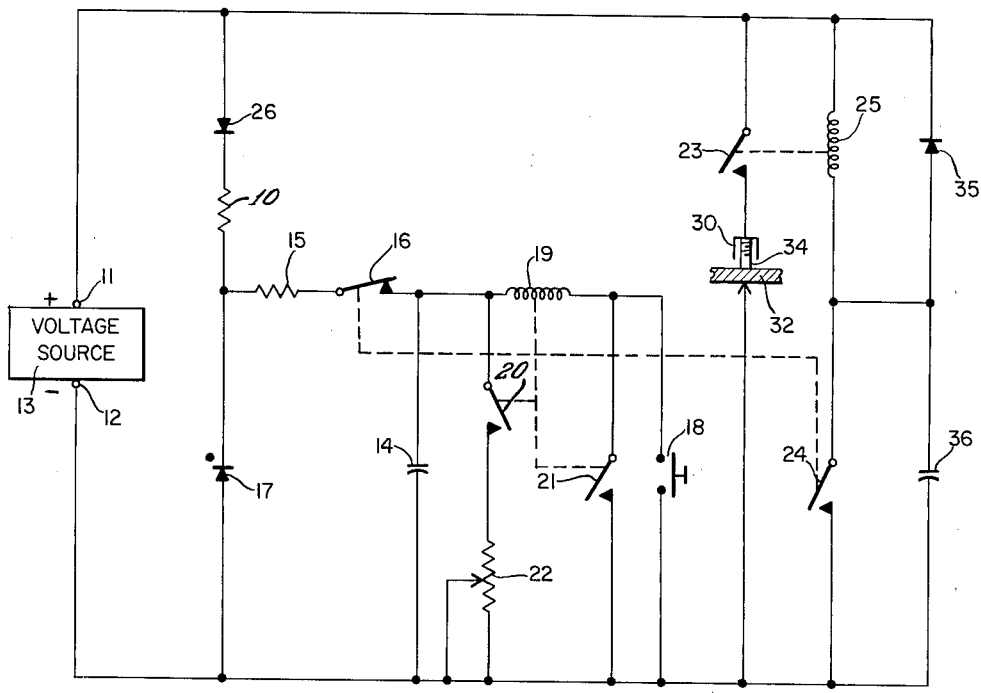
INVENTOR.
GROVER K. HOUPT
BY
Nelson E. Kimmelman
ATTORNEY

United States Patent Office 3,201,616
Patented Aug. 17, 1965

3,201,616
TIMING AND CONTROL CIRCUIT FOR WELDING APPARATUS
Grover K. Houpt, Lansdale, Pa., assignor to Automatic Timing & Controls Inc., King of Prussia, Pa., a corporation of Pennsylvania
Filed June 26, 1961, Ser. No. 119,651
4 Claims. (Cl. 307—141)

This invention relates to timing circuits and in particular to time limit circuits for limiting the time interval of predetermined operations such as welding operations.

In welding, it is often desired to limit the time of the actual welding operation. Often an electrical timer is connected in circuit with the welding equipment and is coupled to the same power source. This has the important disadvantage that when the welding equipment is turned on, the voltage supply to the timer may drop from a value of say 120 volts D.C. to less than 40 or so volts D.C. and thus throw the accuracy of the timer off.

Furthermore, in welding-timing circuits, it often happened that soon after a given welding operation had been completed, the operator accidentally triggered the welding apparatus again which caused the welding gun to be welded to the workpiece.

Still other welding-timing circuits were so constructed and arranged that if a D.C. power source was used, connection of the welding apparatus to terminals of the wrong polarity could damage the apparatus.

The prior art also included circuits in which the length of time that the starting button was depressed affected the accuracy of the timing interval.

Other timing circuits for welding equipment require two or more relays, i.e., one for initiating the welding time interval and one for opening the circuit at the end of the interval to prevent accidental re-triggering of the welding apparatus. Relays are relatively expensive components subject to contact "pitting" and wear and to other problems associated with electromechanical apparatus.

It is therefore an object of the present invention to provide a novel timing circuit in which there is a common source of power for a desired operation and for a circuit or device used to time the operation wherein changes in the power level during the operation do not affect the timing accuracy.

Another aim of this invention is to provide a novel welding time control circuit having a common voltage source for the welding gun and the timer wherein changes in the voltage level cannot affect the accuracy of timing.

Another object of the invention is to prevent malfunction of a welding circuit and damage to the welding workpiece caused by accidental re-triggering of the welding gun immediately after the timing interval is over.

Yet another object of the invention is to provide a novel timing and control circuit for welding apparatus in which the application of a voltage of the wrong polarity to the apparatus does not injure it.

Still another object of the invention is to provide a novel timed energizing circuit for a given operation wherein the accuracy of the timing operation is unaffected by the length of time that the initiating switch makes contact.

Other objects will be apparent to those skilled in the art upon examination of the drawings, claims and specification herein.

These and other objects of the invention are accomplished by my novel circuit in which I provide a time-constant circuit which is energized by a voltage source. When the welding gun trigger is actuated the time-constant circuit discharges through a relay which immediately decouples the time-constant circuit from the voltage source and simultaneously connects the welding electrodes to the voltage source until the end of the timed welding interval. At the end of the interval the relay cuts off the welding electrodes from the voltage source and re-connects the time-constant circuit to the voltage source to charge up the time-constant circuit again preparatory to the next welding operation.

Th sole figure represents in schematic form my invention as applied to a typical timed welding application.

Refering to the sole figure, terminals 11 and 12 of a D.C. voltage source 13 are connected to a time-constant circuit through a diode 26, and Zener diode 17. The source 13 charges a condenser 14 through the resistor 15 which, together wtih resistance 10, determines at what rate the time-constant circuit will be charged. The Zener diode 17 limits the voltage applied to the time-constant circuit. The latter circuit includes a capacitor 14, a variable resistor 22, a relay winding 19 having associated pairs of contacts 16, 20, 21 and 24, and a pushbutton 18.

When it is desired to commence welding the pushbutton 18 is depressed so that the condenser 14 starts to discharge through the winding 19. The current through the winding 19 opens the normally closed contacts 16 so that the time-constant circuit is cut off from the output of the source 13. At the same time, the current through relay 19 closes the normally open contacts 20 and 21, the closing of contacts 21 causing the relay circuit to latch so that if the pushbutton 18 is released, the action of the circuit nevertheless continues. The contacts 20 connect the variable resistor 22 with the condenser 14. The adjustment of the resistance 22 determines, together with the resistance of the relay winding 19, the discharge time of the condenser 14. The contacts 24 are also closed by the current through winding 19 thereby connecting the source 13 to the winding 25 of a relay which thereupon causes its normally open contacts 23 to close. Closure of the contacts 23 connects the source 13 to the welding gun symbolically represented at 30 and to the metal sheet 32 to which a stud 34, for example, is to be welded.

After some time, depending upon the constants of the RC circuit, the charge on condenser 14 drops to the point where the current through the winding 19 is insufficient to maintain its associated contacts 20, 21, 16 and 24 in the same condition. Consequently, those contacts will revert to their original state whereupon the welding operation ceases because contacts 24 become open again and the time-constant circuit is re-coupled to the source 13 and begins to charge up again through closed contacts 16. The resistance 15, together with resistance 10, by controlling the rate of charge of the time-constant circuit, prevent the operator from re-initiating the welding operation by accidental pressure on pushbutton 18 within a specified time after the end of the previous welding operation.

The diode 26 is provided for preventing damage to the circuit in case the time-constant circuit is accidentally hooked up to the wrong terminals of the D.C. source 13.

The diode 35 and the condenser 36 are provided to suppress arcs across contacts 24 when they open.

While the invention has been explained in terms of control of a welding operation, it should be borne in mind that it is equally applicable in many other cases where the same or similar considerations apply. In other words, where it is desired to energize an operation by using a source which is also used to energize a circuit for timing the operation, my invention permits the timing circuit to perform accurately notwithstanding variations in the voltage supplied from the common source during the operation.

I claim:

1. A control circuit adapted to be coupled to a source of substantially fixed uni-directional voltage for controlling a utilization circuit, said control circuit comprising first means energized by said source for enabling said utilization circuit to be energized by said source from the beginning of a predetermined interval, said first means including a capacitor normally coupled to said source which is normally charged thereby and also including means for providing a closed discharge path for said capacitor substantially only during said interval, and second means including switch means responsive to the discharge of said capacitor to said discharge path for decoupling said first means from said source at the beginning of said interval, said first means being adapted to be recoupled to said source at the end of said timing interval and said second means being adapted to decouple said utilization circuit from said source at the end of said interval.

2. A control circuit adapted to be coupled to a source of fixed uni-directional voltage for controlling a utilization circuit which is also to be energized by said source, comprising: first means normally coupled to said source for measuring, in response to initiation thereof, a predetermined time interval, said first means including a capacitor normally coupled to said source and normally charged thereby and also including a resistor coupled to said capacitor, said first means further including means for providing a closed discharge path for said capacitor substantially only during said interval, said discharge path including an inductance and first switching means actuated by said discharge through said inductance, and second means coupled to and responsive to said first means and to said utilization circuit for enabling said utilization circuit to be energized by said source substantially only during said interval, said first means being constructed to be decoupled from said source substantially only during said interval.

3. A control system comprising, in combination: a source of electrical D.C. power, a first timing circuit coupled to said source, said timing circuit including capacitive means and resistive components in a time constant circuit which is normally charged by said source, so that its electrodes normally bear opposite charges, said components having values which may be adjusted for establishing predetermined intervals of time, said first circuit also including a first switch for initiating the discharge of said time-constant circuit and a discharge path for said capacitive means which is switchably coupled to said capacitive means upon said discharge, and a second circuit adapted to be coupled to said source, said second circuit including a second switch, said first circuit being constructed and arranged to enable said second circuit to be energized by said source via said second switch when said first switch is actuated and said time-constant circuit is discharging, whereupon said first circuit is decoupled from said source.

4. A control circuit comprising:
(a) a source of substantially fixed uni-directional voltage,
(b) a first switching means which is normally closed,
(c) a capacitor normally coupled to said source via said first switching means,
(d) inductive means having a first terminal thereof coupled to said capacitor,
(e) second switch means in series with said capacitor and said inductive means and being constructed normally to be open,
(f) resistance means having a first terminal coupled to said capacitor,
(g) third switching means which is normally open and is coupled to a second terminal of said resistance means and to said first terminal of said inductive means,
(h) fourth switching means which is normally open, said first, second, third and fourth switching means being responsive to the passage of current through said first inductive means,
(i) a second inductive means in series with said fourth switching means, said series circuit being in parallel with said source,
(j) a fifth switching means is normally open and adapted to be closed in response to the passage of current through said second inductive means and
(k) a utilization circuit in series with said fifth switching means, the series combination being parallel with said voltage source.

References Cited by the Examiner

UNITED STATES PATENTS

| | | | |
|---|---|---|---|
| 2,076,290 | 4/37 | Bliss | 307—141.4 |
| 2,077,600 | 4/37 | Watson | 307—141 X |
| 2,123,063 | 7/38 | Peters | 307—141.4 |
| 2,301,598 | 11/42 | Weyenberg | 307—141.4 |
| 2,882,456 | 4/59 | Koch | 317—141 X |
| 2,938,127 | 5/60 | Spinelli et al. | 317—141 X |
| 3,131,333 | 4/64 | Stevens | 317—141 |

LLOYD McCOLLUM, *Primary Examiner*,

ORIS L. RADER, *Examiner*.